June 30, 1953   E. H. MULLINS   2,644,136
ULTRAHIGH IMPEDANCE ELECTROMETER TUBE VOLTMETER
Filed Oct. 25, 1950   2 Sheets-Sheet 1

INVENTOR.
E H Mullins
BY
ATTYS.

June 30, 1953          E. H. MULLINS          2,644,136

ULTRAHIGH IMPEDANCE ELECTROMETER TUBE VOLTMETER

Filed Oct. 25, 1950          2 Sheets-Sheet 2

INVENTOR.
E. H. Mullins

Patented June 30, 1953

2,644,136

UNITED STATES PATENT OFFICE 2,644,136

ULTRAHIGH IMPEDANCE ELECTROMETER TUBE VOLTMETER

Elwood H. Mullins, Washington, D. C.

Application October 25, 1950, Serial No. 192,099

6 Claims. (Cl. 324—101)

(Granted under Title 35, U. S. Code (1952), sec. 266)

This invention relates to voltmeters and more particularly to a type of vacuum tube voltmeter incorporating an electrometer tube and associated circuit, whereby an ultrahigh impedance in the order of $10^{15}$ ohms, and an input capacity in the order of 5 micromicrofarads is presented to voltage sources to be measured therewith.

Heretofore other devices available for the purpose of measuring voltages such, for example, as the residual voltage left in small capacitors after a momentary short circuit discharge as a result of dielectric absorption within the capacitor without appreciably reducing or otherwise disturbing the energy thereon, or the voltage produced by energy stored in a small capacitor, such as, a 0.0001 microfarad capacitor without appreciably reducing or otherwise disturbing the charge thereon, or the voltage changes produced in ionization chambers due to ion current flow resulting from the presence of X-rays or other forms of radiation nearby, have presented relatively low resistance and relatively high capacitance to the source being measured, thereby dissipating all or most of the stored energy and corresponding voltage of the source to be measured, when the source is connected to the input terminals of the measuring instrument. Therefore, in the use of prior art devices of this character, it has heretofore been difficult and in most instances impossible to obtain true and accurate measurements, and in particular, to be able to leave the measuring device connected to small electrostatic voltage sources for considerable periods of time, without noticeably reducing or otherwise disturbing the energy thereon.

Further examples of voltages of the type herein considered are: The electrode potentials encountered in pH measurements, the potentials produced by ion currents encountered in mass spectrograph measurements, the potentials encountered in biological studies, or the output voltage of small piezoelectric generators having characteristically high internal impedances.

The present invention employs an electrometer tube suitable for the purpose, in the input circuit. The input characteristics of such a tube have been incorporated into this invention in such manner as to produce a multiple range voltmeter capable of indicating full scale voltage readings of 1.5, 5, 15, and 50 volts for ranges 1, 2, 3, and 4 respectively to an accuracy of 2% or less of the full scale reading, while maintaining the ultrahigh input impedance of the aforesaid electrometer tube. Additional ranges of below 1.5 volts full scale, and in excess of 50 volts full scale, for example, or intermediate values between the foregoing ranges, can be obtained by expansion of the principles of the present invention.

By employing the foregoing arrangement a stable, portable voltmeter has been devised which is relatively easy to manufacture and which requires less than 0.0001 erg of input power to drive the meter from zero to full scale reading on the lowest range and which requires proportionately small input power when used with the other ranges.

It is an object of the present invention to provide a new and improved voltmeter which presents an ultrahigh input impedance in the order of $10^{15}$ ohms and an input capacity in the order of 5 micromicrofarads to the voltage source to be measured thereby.

Another object is to provide a new and improved multiple range electrostatically responsive voltmeter which will measure the voltage associated with a small quantity of electrostatic charge without appreciably reducing or otherwise disturbing the charge of the voltage source.

A further object is to provide a multiple range low voltage electrostatically responsive voltmeter capable of giving a full scale reading on a fully expanded scale corresponding to an input voltage of 1.5 volts, or a selected fractional portion thereof.

A still further object is to provide a new and improved voltmeter utilizing the input impedance characteristics of an electrometer tube combined with a cathode follower type of degenerative feedback, whereby stability, linearity and multiple ranges are provided without the necessity of resetting the zero adjustment of the instrument as the range is changed.

An additional object is to provide a new and improved low voltage electrostatically responsive voltmeter which is portable, rugged and reliable in operation for any position of the instrument.

Still another object is to provide a multi-range electrostatically responsive voltmeter which employs batteries as its source of power, or alternatively, may draw its required operating power from a commercial A. C. power source.

A further object is to provide a new and improved multiple range low voltage electrostatically responsive voltmeter with a constant input capacity in the order of 5 micromicrofarads, for all voltage ranges of operation.

A still further object is to provide a new and improved multiple range low voltage electrostatically responsive ultrahigh impedance voltmeter suitable for use with a fully expanded scale direct reading device, or alternatively, for use with a recording instrument.

Additional objects, features, and advantages of the present invention are those residing in and relating to the novel construction and arrangement of the circuit elements thereof, as will become more clearly apparent as the description proceeds, reference being had to the accompanying drawings of which:

Figure 1:
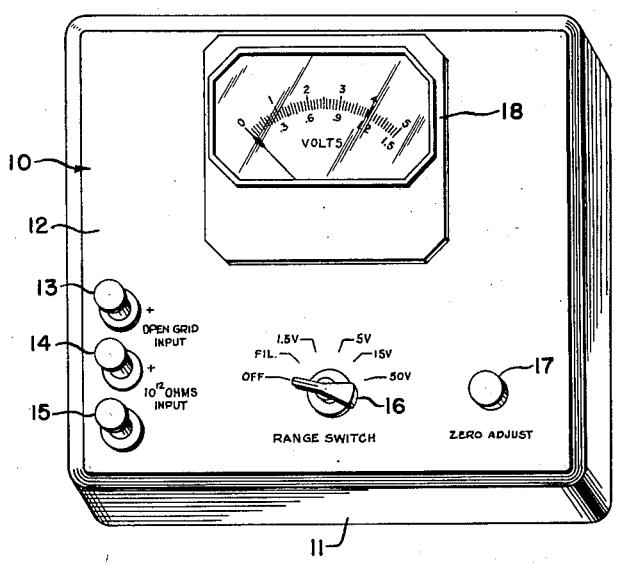
Fig. 1 is a perspective view of a portable, battery powered, ultrahigh impedance electrometer tube voltmeter constructed in accordance with a preferred embodiment of the invention.

Referring now to the drawings for a more complete understanding of the invention, and more particularly to Fig. 1 thereof, there is shown thereon a voltmeter indicated generally by the numeral 10 and comprising a case 11 and a panel 12. The panel preferably is made of good dielectric material such, for example, as a material known to the trade as "black polystyrene," and has mounted thereon a positive input terminal 13 which is connected directly to the electrometer tube control grid, another positive terminal 14 which is connected to one end of a $10^{12}$ ohm resistor, a negative input terminal 15 connected to the other end of the $10^{12}$ ohm resistor and to the electrometer tube cathode, a voltage range switch 16, a zero adjust knob 17, and a panel indicating meter 18 which indicates the values of the voltage sources measured.

Figure 2:
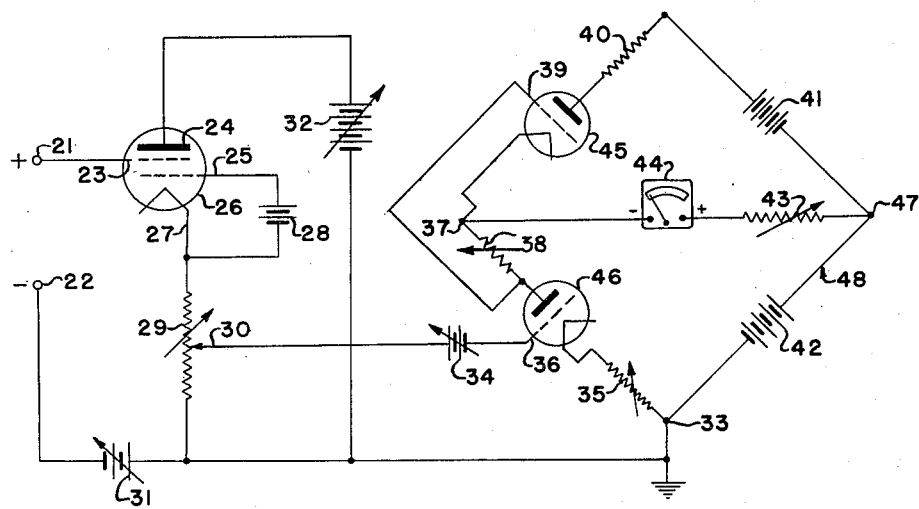
Fig. 2 is a simplified schematic circuit suitable for use with the voltmeter of Fig. 1.

Referring now to Fig. 2, the electrometer tube 26 is a tetrode having a conventional filament cathode 27. The first grid 25 of tube 26 is connected to the positive potential side of a voltage source 28, and the cathode 27 is connected to the negative side of 28. The second grid 23 of tube 26 serves as the signal input grid and is connected to the positive input terminal 21. The plate 24 of tube 26 is connected to the positive potential side of a suitable voltage source 32, and the cathode 27 of tube 26 is connected through an impedance element 29 to the negative side of 32. The negative side of source 32 is also connected to the positive side of a grid bias voltage source 31 and to the grounded corner 33 of a Wheatstone bridge circuit generally designated 48.

The Wheatstone bridge circuit 48 comprises a tube 46, and impedance elements 35 and 38, connected in series with another tube 45 and an impedance element 40, all of which comprise two adjacent arms of the bridge circuit. The remaining two arms consist of two series connected voltage sources 41 and 42. An indicating meter 44 with a series impedance element 43 is connected between point 37 and point 47 of the bridge circuit. Impedance elements 35, 38, 40, and 43 are preferably of the variable type, the purpose of which will be more clearly apparent as the description proceeds.

The negative input terminal 22 is connected to the negative potential side of the bias voltage source 31 and the tap point 30 of the impedance element 29 is connected to the positive potential side of the bias voltage 34, the negative side of which is connected to the signal grid 36 of tube 46. The signal grid 39 of tube 45 is connected to the plate of tube 46. For additional understanding of the bridge circuit 48, the two impedance elements 35 and 38 are ganged and operated simultaneously such that the impedance of one decreases at exactly the same rate at which the other increases, thereby providing a means for obtaining the desired zero adjustment of the bridge circuit. The value of the impedance element 40 is chosen as the sum of the impedances 35 and 38. The impedance element 43 is adjustable for obtaining the desired overall gain of the bridge circuit thereby providing a means for calibration of the full scale meter readings. This control element is normally set at some selected value depending upon the values of the other circuit elements and then remains fixed for all voltage ranges.

To more fully describe the operation of the circuit shown in Fig. 2, let it be assumed by way of example that it is desired to measure the voltage on a 0.0005 microfarad capacitor that has previously been charged from a voltage source. Before making the measurement the bridge circuit 48 is balanced to give a zero volt reading on meter 44 by adjusting the ganged combination of impedances 35 and 38. The value of the bias voltages 34 and 31 have been predetermined and set for the particular voltage range to be employed. Likewise the value of the grid voltage 28 and plate voltage 32 for tube 26, and the value of the cathode impedance 29 and the tap point 30 have each been predetermined and set for the range selected.

The charged capacitor is now brought into contact with the input terminals 21 and 22 with point 21 being positive. When this occurs the increase in potential of the grid 23 with respect to the cathode 27 causes an increase in current flow from the source 32, through the tube 26 and impedance 29, thereby causing a proportional increase in potential at the output tap 30, which now follows an obvious path to the grid 36 of tube 46 thus changing the potential of the grid 36 with respect to the cathode of tube 46, thereby unbalancing the bridge circuit and causing a current flow through the indicator meter 44, which is proportional to the value of the voltage applied at the input terminals 21 and 22. The impedance presented to the source being measured is the characteristic ultrahigh impedance between the electrometer tube grid 23 and the cathode 27, plus the series impedance element 29.

Figure 3:
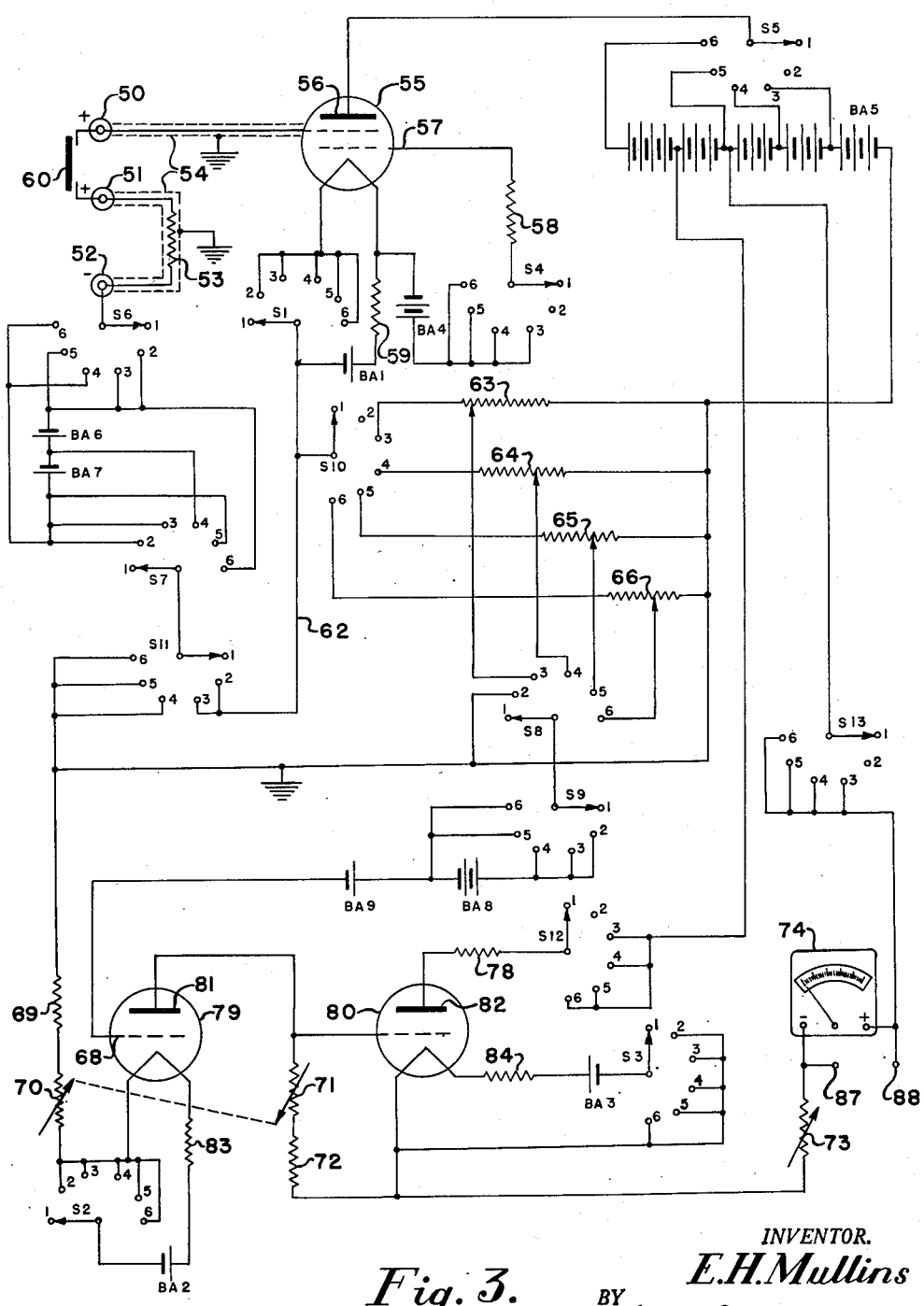
Fig. 3 is a diagrammatic view of a complete electrical circuit suitable for use with the voltmeter of Fig. 1.

Referring now to Fig. 3 for a still further understanding of the invention, a ganged six position switch comprising switching elements S1 through S13 automatically selects the necessary voltage and impedance values for the voltage ranges 1.5, 5, 15, and 50 volts corresponding to switch positions 3, 4, 5, and 6 respectively. Switch position 1 is an "off" position whereby all circuits are open circuited. Switch position 2 energizes the filaments of tubes 55, 79, and 80 from BA1 through switch S1, from BA2 through switch S2, and from BA3 through switch S3 respectively, and also applies a positive potential to grid 57 of tube 55 with respect to the cathode from BA4 through switch S4. BA1 through BA9 designates generally D. C. voltage sources. Switch positions 3, 4, 5, and 6 maintain the filaments energized and furthermore select the required source potential from BA5 through switch S5 for the plate 56 of tube 55, the necessary bias voltage for the input terminal 52, from BA6 and BA7 through switches S6 and S7 respectively, the required cathode impedance element either 63, 64, 65, or 66 through S10, the necessary proportional part of the respective cathode impedance elements 63, 64, 65, and 66 through S8, the required bias voltage from BA8 and BA9 through S9 for the grid 68 of tube 79, the necessary positive potential for plate 82 of tube 80 from BA5 through S12 and impedance element 78, the necessary positive potential for plate 81 of tube 79 from BA5 through S13, meter 74 and impedance elements 71, 72, and 73, and finally the return circuit connection through S11 and impedance elements 69 and 70.

Impedance elements 59, 83, and 84 are current limiting impedances associated with potential sources BA1, BA2, and BA3 respectively, each chosen to give the desired filament current in the respective tubes 55, 79, and 80. Impedance element 58 is likewise a current limiting element associated with the potential source BA4 and grid 57 of tube 55. Impedance elements 70 and 71 are ganged in such manner as to increase the impedance of one element at exactly the same rate of decrease in impedance of the other element, thereby providing a simple method for zero balancing of the bridge circuit generally designated as 48, Fig. 2. Impedance elements 69 and 72 are fixed impedances associated with the variable impedances 70 and 71. Impedance element 78 is preferably equal in value to the sum of impedances 69 and 70 plus 71 and 72 and serves as a plate load impedance for plate 82 of tube 80. Impedance element 73 is a variable impedance for adjusting the overall gain or amplification of the bridge circuit thereby providing a means for full scale adjustment of the meter 74 for a given input voltage at terminals 50 and 52. Terminals 87 and 88 are output jacks for optional use with a recording instrument. The input impedance element 53 is a $10^{12}$ ohm resistor provided for selectively shunting the input terminals 50 and 52 with $10^{12}$ ohms when the shorting bar 60 is depressed thereby connecting terminals 50 and 51 together.

Grounded shielding generally designated 54 is provided around the input grid circuit from terminal 50 to the control grid of tube 55 and around the input shunting resistor element 53 to prevent stray electrostatic charges from collecting at or near the input circuit. A circuit connection 62 provides a means of connecting the bias potential from BA6 and BA7 directly to the cathode end of the impedance element 63 for range switch positions 2 and 3 whereas with switch S11 in position 4, 5, or 6, the bias voltage BA6 and BA7 is connected to the grounded end of the cathode impedances 64, 65, and 66. This procedure is necessary to maintain the desired operating characteristics of tube 55 as the voltage ranges are changed.

From the foregoing, operation of the voltmeter in use should now be apparent, it being understood that the filament power has been turned on prior to the voltage measurement for a sufficient period of time to allow the filament temperatures to become stabilized. When zero potential across the input terminals 50 and 52, Fig. 3, the zero adjust device comprising impedances 70 and 71 is set to give zero voltage reading on the indicator meter 74. The instrument is now ready for placing the unknown voltage across the input terminals.

If the polarity of the unknown voltage is not known, the instrument will determine this fact, since a negative voltage applied to the input terminals will drive the indicator meter down scale, below zero and, conversely, a positive voltage signal will drive the meter in the opposite direction. The range switch is now set to give the best readability for the particular voltage under test. An unknown voltage, the magnitude of which is several times the full scale reading of the selected voltage range, will not damage the meter since overload protection is provided by plate current saturation of the tubes in the bridge circuit 48, Fig. 2.

It will be noted by those skilled in the art to which the invention appertains that, Fig. 3, with the switch in position 4, 5, or 6 the impedance elements 64, 65, and 66 are connected respectively to the electrometer tube cathode through switching element S10, thereby providing a degenerative feedback circuit of the cathode follower type, whereas with the switch in position 3 the negative bias voltage source BA6 and BA7 is disconnected from the ground connection through S11 and the positive side of the negative bias voltage source is reconnected to the cathode end of impedance element 63, the other end of 63 being continuously grounded. This action is employed to obtain the desired operational characteristics of the voltmeter for the low input voltage range when the switch is set in position 3. Furthermore, by proper selection of the values of voltages and impedance elements controlled by the multiposition switch, full scale input voltage ranges of less than 1.5 volts may be obtained. Whereas it will be noted that, as shown on Fig. 3, the combination of the shorting bar 60, the auxiliary positive terminal 51 and the resistor 53, is provided for optional use in measurements where $10^{12}$ ohms input impedance is adequate for the purpose, or for obtaining zero stability of the indicator meter when the voltage range switch is to be left on one of the moved settings 3, 4, 5, or 6 but without a voltage source or impedance device connected across the input terminals 50 and 52, this value of $10^{12}$ ohms for the resistor has been selected for the purpose of description as various other values in excess of $10^{11}$ ohms may be employed.

From the foregoing description it should now be apparent that a voltmeter has been provided which is well adapted to fulfill the aforestated objects of the invention. Moreover, it will be understood by those skilled in the art to which the invention appertains that variations in the circuit arrangement and in the choice of circuit elements employed may be made without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. An ultrahigh impedance electrometer tube voltmeter of the character disclosed for measuring the value of voltage at a source corresponding to a small quantity of electrostatic charge, or for measuring the voltage of a device characterized by high internal impedance, without appreciably reducing or otherwise disturbing the energy of said voltage source, comprising in combination, an electrometer discharge device having an anode, a cathode, a control grid between said anode and cathode and a space charge grid between said control grid and cathode, said discharge device being further characterized as having ultrahigh impedance between said control grid and said cathode; a degenerative circuit in which said discharge device is included, said circuit comprising a primary source of D. C. power having points of high and low potential, said point of high potential being connected to said anode; an impedance element series connected between said point of low potential and said cathode; a second source of D. C. power having points of high and low potential connected to said space charge grid and to said cathode respectively; an ultrahigh impedance input circuit comprising a positive input terminal and a negative input terminal, said positive terminal being connected to said control grid; a bias voltage source having points of positive and negative potential, said negative input terminal being connected to said last named point of negative potential, the last named point of positive potential being connected to the low potential point of said primary source of D. C. power; a pair of output elements, one of said output elements being connected to the low potential point of said impedance element and the other output element being connected to a predetermined selected point on said impedance element; and means responsive to variations in the space current of the electrometer discharge device caused by different voltages selectively applied to the input terminals for indicating the instant values of said voltages.

2. An ultrahigh impedance electrometer tube voltmeter of the character disclosed for indicating the presence of an electrostatic field within the vicinity thereof, or for measuring the value of the voltage produced by a small quantity of electric charge at a source without appreciably reducing the voltage or otherwise disturbing the energy of the voltage source, comprising in combination, an electrometer discharge device having a plate, control grid, space charge grid and cathode; a cathode follower circuit having first and second sources of D. C. power, a bias voltage source, a plurality of impedance elements each comprising an adjustable slider contact; means settable at will for selecting one of said impedance elements and concurrently therewith selecting the slider contact corresponding thereto; a pair of input terminals; said cathode follower circuit comprising an electrical connection from the high potential side of said first source of D. C. power to said plate, said electrical connection including means controlled by said settable means for connecting a predetermined fractional portion of the voltage of said first source of D. C. power to said plate, a series connection from the low potential side of said first source of D. C. power through the selected impedance element to said cathode, said second source of D. C. power being connected in series between said cathode and said space charge grid with the low potential side thereof connected to the cathode, an electrical connection from one of said input terminals to said control grid, an electrical connection from the other input terminal to the negative side of said bias voltage source; means for connecting a selected portion of the positive side of the bias voltage source to the low potential side of said first source of power; a voltage output circuit having one side thereof connected to the adjustable slider on the selected impedance element and comprising the positive potential side thereof, the negative potential side of said output circuit being connected to the low potential side of said first source of power, voltage amplifying means including an electroresponsive indicator element having a plurality of voltage ranges and connected across the output circuit, each of said ranges corresponding to a predetermined setting of said settable means whereby the amount of negative feedback and circuit response may be varied to provide a plurality of ranges of input voltage to be measured by the voltmeter.

3. An ultrahigh impedance electrometer tube voltmeter of the character disclosed for measuring high impedance voltages at a low energy source without appreciably reducing the voltage or otherwise disturbing the energy of said voltage source, comprising in combination, an electrometer discharge device having a plate, control grid, space charge grid and cathode; a first source of D. C. power; a second source of D. C. power; a bias voltage source; an adjustable impedance element having an adjustable slider contact; a series circuit connecting said plate to the high potential side of said first source of D. C. power, the low potential side of said first source of D. C. power being connected through said adjustable impedance element to said cathode, said cathode also being connected to the low potential side of said second source of D. C. power, said space charge grid being connected to the positive potential side of said second source of D. C. power; an input circuit having a positive input terminal and a negative input terminal connected to said control grid and to a point of negative potential on said bias voltage source respectively, the positive point of said bias voltage source being connected to the low potential side of said first source of D. C. power; an output circuit having a low potential output element and a high potential output element, said slider contact being connected to the high potential element, said low potential side of said first source of D. C. power being connected to the low potential element; a power amplifying bridge circuit having two series connected sources of D. C. power respectively in two adjacent arms thereof, and the other two adjacent arms comprising two series connected electron discharge devices respectively, said electron discharge devices each comprising a plate, control grid and cathode, said control grid of the electron discharge device in the arm adjacent to the low potential point of said bridge circuit comprising the input control element for said bridge circuit and being connected to said high potential output element, the plate and cathode of said last named electron discharge device being respectively connected to a pair of impedance elements, said output circuit being connected between the low potential point of said bridge circuit and said control grid of the electron discharge device adjacent thereto, a diagonal circuit comprising a voltage indicating meter connected between the junction point of the plate impedance of said last named discharge device and the cathode of the other discharge device in said bridge circuit and the junction point between said series connected D. C. power sources, whereby a change of space current in said electrometer discharge device causes a change of potential at said slider contact thereby changing the potential of the last named control grid to effect a deflection of the indicating meter as an indication of the instant value of voltages selectively applied to the input of the voltmeter.

4. An ultrahigh input impedance voltmeter of the character disclosed for measuring high internal impedance voltages at a low energy source without appreciably reducing the voltage or otherwise disturbing the energy of said voltage source, comprising in combination, an electrometer discharge device, having a plate, control grid, space charge grid, and cathode; a control circuit in which said electrometer discharge device is included, said circuit including, a first source of D. C. power, an adjustable impedance element containing a slider contact for obtaining any portion thereof of said impedance element, a second source of D. C. power, and a bias voltage source; an input circuit comprising a pair of input terminals, an output circuit comprising a pair of output elements and a second bias voltage source, said plate being connected to the high potential side of said first source of D. C. power, the low potential side of said first source of D. C. power being series connected through said adjustable impedance element to said cathode, said cathode being connected to the low potential side of said second source of D. C. power, the high potential side of said second source of D. C. power being connected to said space charge grid, said control grid being connected to one of said input terminals, the other input terminal being connected to the negative potential side of said first named bias voltage source and thence in series to the low potential side of said first source of D. C. power and to one of said output elements, said slider contact on said impedance element comprising the other output element; a power amplifying bridge circuit having two sources of D. C. power connected respectively in two adjacent arms thereof, each of the other two adjacent arms comprising a first and second series connected electron discharge device respectively, said electron discharge devices each comprising a plate, control grid and cathode, the plate and cathode of said first electron discharge device being series connected to a pair of adjustable and interconnected impedance elements respectively whereby an increase in the impedance of one element is effected simultaneously and at the same rate of decrease in impedance value of the other element thereby providing a means for initial balancing of the bridge circuit, said bridge circuit having a low potential point comprising the connection between the low potential side of said two series connected sources of D. C. power and the adjacent end of said adjustable impedance element series connected to said cathode of the first named electron discharge device, said control grid of said first named electron discharge device being series connected to the negative side of said second bias voltage source, the positive side of said second bias voltage source being connected to said other output element, said low potential point of said bridge circuit being connected to the first named output element, said second electron discharge device being series connected through a plate impedance element to the high potential side of said series connected D. C. power sources, said control grid of last named electron discharge device being connected to the junction point between the first named electron discharge device and said plate impedance element of said first electron discharge device, a diagonal circuit comprising a series connected voltage indicating meter and adjustable impedance element, said last named circuit being connected between the junction point of said series connected D. C. power sources and the cathode of said second electron discharge device, said last named adjustable impedance element comprising a means for selectively adjusting the overall amplification of said bridge circuit, a pair of output terminals connected in parallel with the terminals of said voltage indicating meter, said output terminals providing a means for adapting the voltmeter as an impedance transforming device to a recording instrument, said meter having a multiple scale dial and a moving coil element with attached pointer whereby the instant value of different voltages selectively applied to the input terminals is indicated on said dial.

5. A claim according to claim 4 and including in addition, means for adjusting the effective voltage of said first source of D. C. power concurrently with the adjustment of said first named adjustable impedance element, said slider contact, and the effective voltage of said bias voltage sources.

6. An ultrahigh input impedance voltmeter of the character disclosed for measuring low energy, high internal impedance voltages at a source without appreciably reducing the voltage or otherwise disturbing the energy of said voltage source, comprising in combination, an input circuit having a series connected adjustable negative bias voltage in the low potential element, an electrometer discharge device having a plate, control grid, space charge grid, and a cathode; said control grid connected to the high potential element of said input circuit; a series connected circuit from said plate to said cathode comprising an adjustable D. C. power source and an adjustable impedance element in the order named; said adjustable D. C. power source, impedance element and negative bias voltage comprising means whereby multiple input voltage ranges are obtained; a second source of D. C. power connected between said cathode and said space charge grid; a bridge circuit comprising two D. C. power sources series connected in two adjacent arms thereof respectively, a first and second electron discharge device each having a plate, control grid, and cathode, a pair of adjustable impedance elements respectively connected to the plate and cathode of said first discharge device and included in one of the other arms of said bridge; said second electron discharge device having the control grid thereof connected to said plate of said first electron discharge device and the plate thereof series connected through an impedance element to the high potential side of said two series connected D. C. power sources; said control grid of said first electron discharge device being connected in series through an adjustable bias voltage source to a preselected point on first named adjustable impedance element, said bridge circuit having a common low potential point connected to the junction point between said first named D. C. power source and said first named adjustable impedance element, said bridge circuit having a series circuit connected between the cathode of said second electron discharge device and the midpoint between said two series D. C. power sources, the last named circuit comprising an indicating meter and adjustable impedance element; said pair of adjustable impedance elements being ganged to simultaneously change the values of impedance thereof reciprocally as zero adjustment of the meter is made thereby providing a means of balancing the bridge circuit when the input terminals of the voltmeter are short circuited, said indicating meter being multi-calibrated to indicate the instant value of different voltages selectively applied to the input circuit of the voltmeter and corresponding to a selected input voltage range.

ELWOOD H. MULLINS.

References Cited in the file of this patent

UNITED STATES PATENTS

| Number | Name | Date |
|---|---|---|
| 1,969,518 | Moles | Aug. 7, 1934 |
| 2,503,248 | Deeter | Apr. 11, 1950 |
| 2,516,984 | Havenhill et al. | Aug. 1, 1950 |
| 2,531,609 | Bulgin | Nov. 28, 1950 |
| 2,609,512 | Conviser | Sept. 2, 1952 |

OTHER REFERENCES

Publication I—"Electronics," March 1947, pp. 106–109. Subminiature Electrometer Tube. In Class 171-95-22.